United States Patent
Derrien et al.

(10) Patent No.: US 6,805,320 B2
(45) Date of Patent: Oct. 19, 2004

(54) AIRCRAFT LANDING GEAR WITH HIGHLY OFFSET STRUT PIVOT AXIS

(75) Inventors: Michel Derrien, Versailles (FR); Benjamin Parzy, Bourg-la-Reine (FR)

(73) Assignee: Messier-Dowty SA, Velizy Villacoublay (FR)

( * ) Notice: Subject to any disclaimer, the term of this patent is extended or adjusted under 35 U.S.C. 154(b) by 0 days.

(21) Appl. No.: 10/220,526

(22) PCT Filed: Feb. 27, 2001

(86) PCT No.: PCT/FR01/00562

§ 371 (c)(1), (2), (4) Date: Aug. 28, 2002

(87) PCT Pub. No.: WO01/64511

PCT Pub. Date: Sep. 7, 2001

(65) Prior Publication Data

US 2003/0029966 A1 Feb. 13, 2003

(30) Foreign Application Priority Data

Mar. 2, 2000 (FR) .......................... 00 02673

(51) Int. Cl.[7] ............................. B64C 25/10
(52) U.S. Cl. ............... 244/102 A; 244/102 R
(58) Field of Search ................. 244/100 R, 102 R, 244/102 SS, 102 A, 102 SL, 103 R, 104 R, 104 FP

(56) References Cited

U.S. PATENT DOCUMENTS

| | | | |
|---|---|---|---|
| 1,914,092 A | | 6/1933 | Henrichsen et al. |
| 2,849,199 A | * | 8/1958 | Lucien |
| 4,132,376 A | * | 1/1979 | Sharples |
| 4,345,727 A | * | 8/1982 | Brown et al. |
| 4,537,374 A | * | 8/1985 | Barnoin et al. |
| 4,720,063 A | * | 1/1988 | James et al. |
| 6,318,669 B1 | * | 11/2001 | Dazet et al. |

FOREIGN PATENT DOCUMENTS

| | | |
|---|---|---|
| DE | 2924741 | 1/1981 |
| GB | 1490088 | 10/1977 |

* cited by examiner

Primary Examiner—Tien Dinh
(74) Attorney, Agent, or Firm—McCormick, Paulding & Huber LLP

(57) ABSTRACT

An aircraft landing gear includes a leg having a strut receiving a telescopic rod to slide on a sliding axis, the strut being hinged to an aircraft structure and being capable of pivoting about a pivot axis that is highly offset from the sliding axis. The landing gear further includes a connection structure essentially comprising two panels connecting two axially separate points of the strut to a common axis structure extending along the strut pivot axis. In the gear-down position, the panels are one above the other, the top panel being connected to the strut via a high attachment which is rigid in twisting, while the bottom panel is connected to the strut via a low attachment which tolerates twisting, thereby enabling the strut to warp to some extent when the aircraft is turning while taxiing.

13 Claims, 5 Drawing Sheets

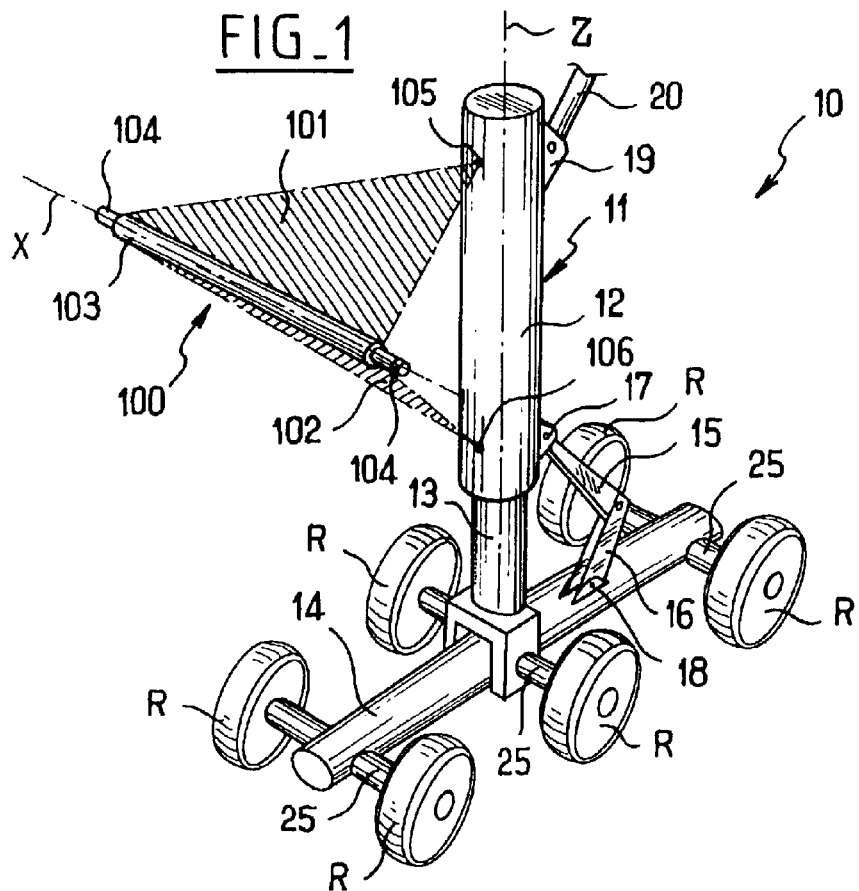
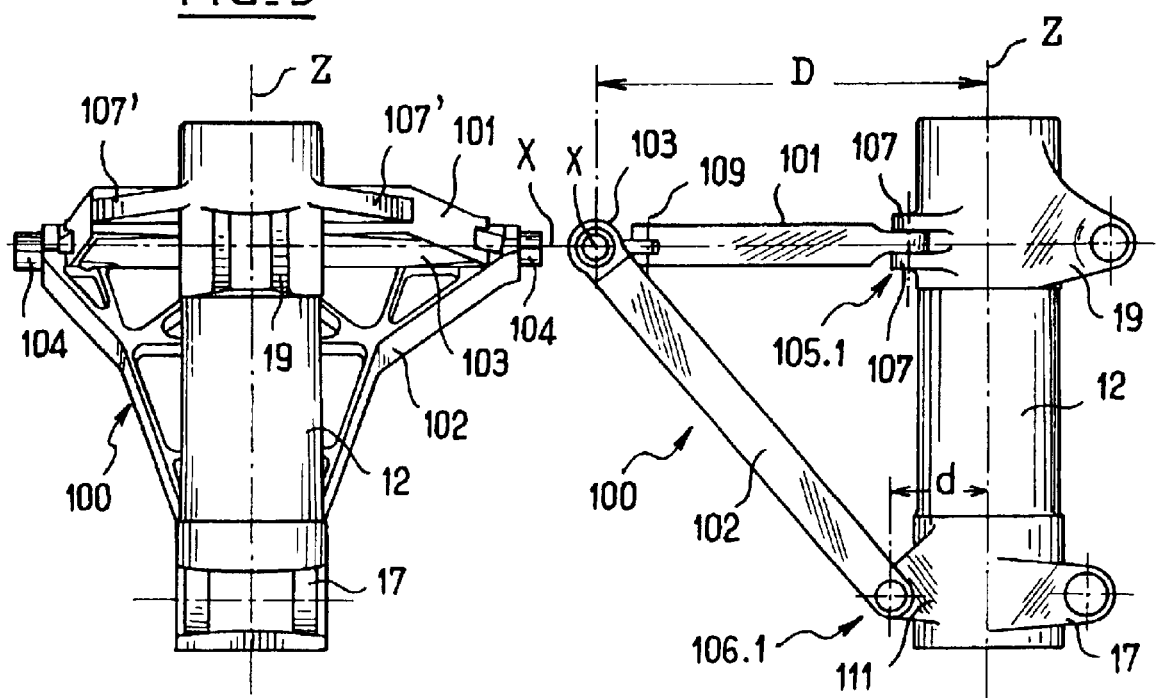

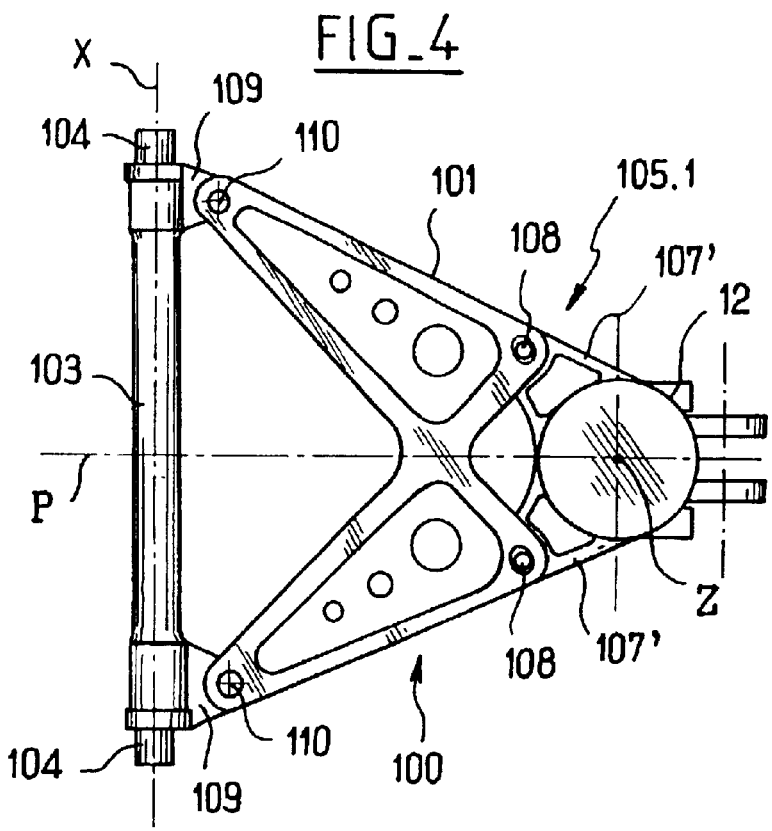
FIG_4
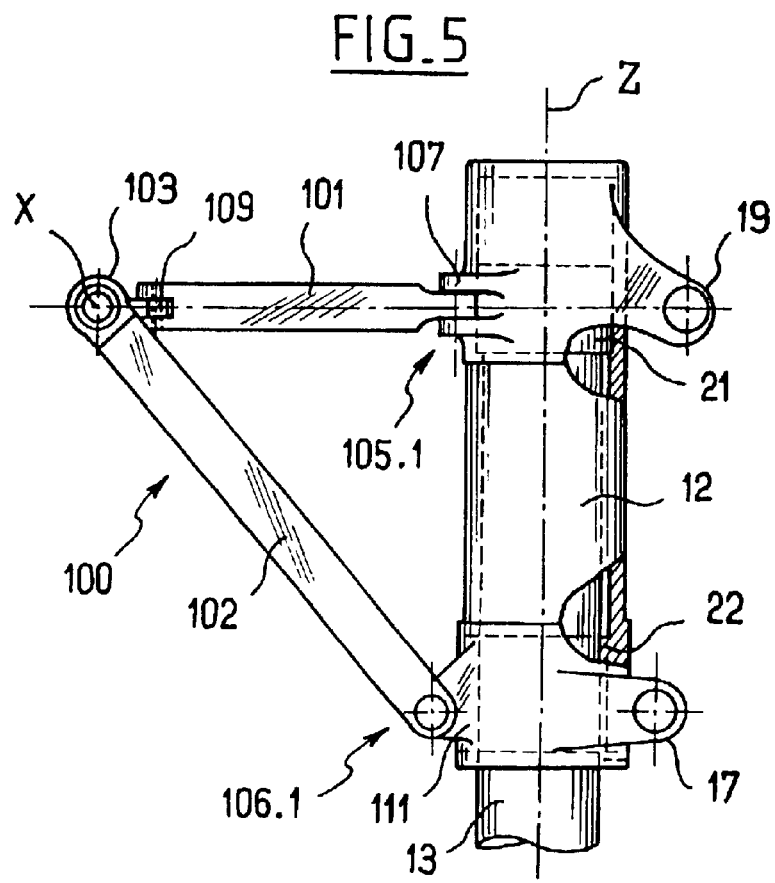
FIG_5

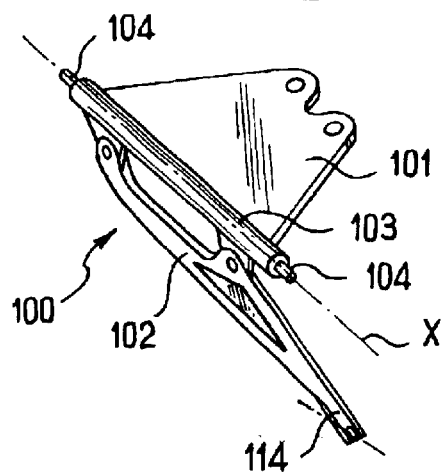
FIG_6
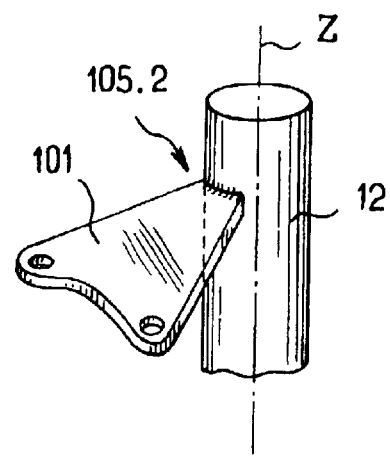
FIG_7
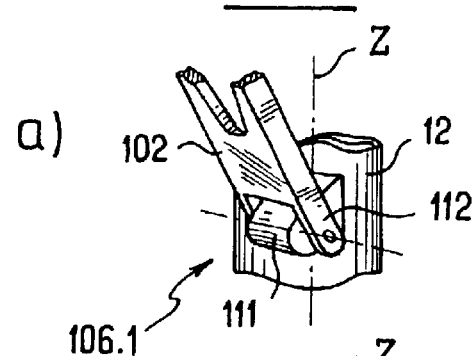
FIG_9 a)
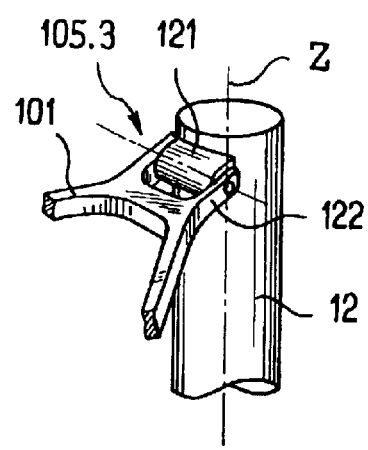
FIG_8
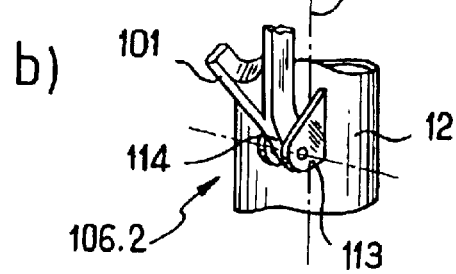
b)
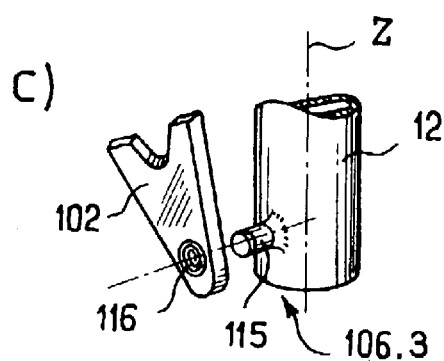
c)

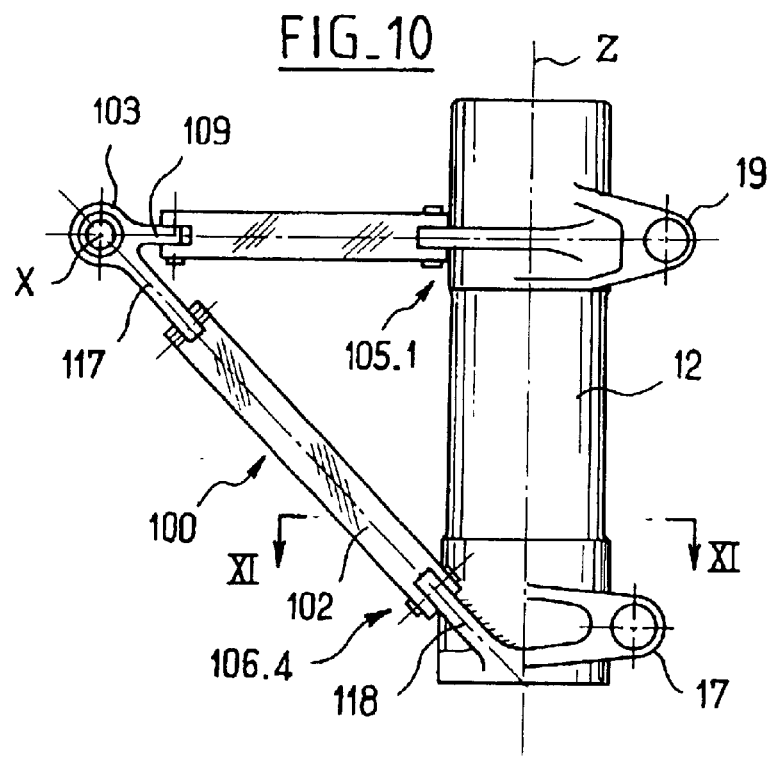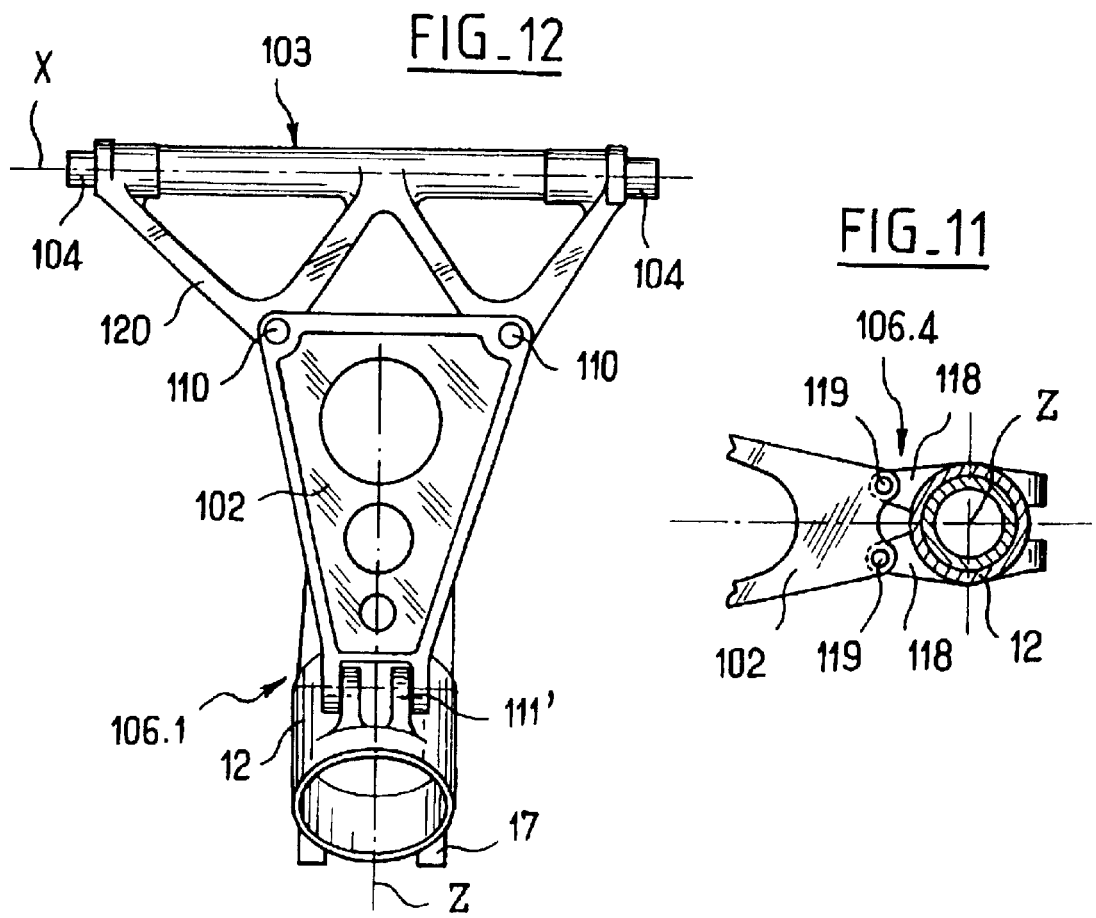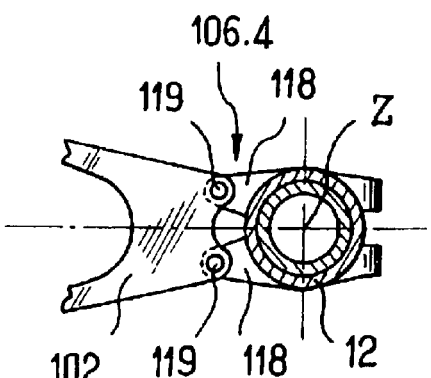

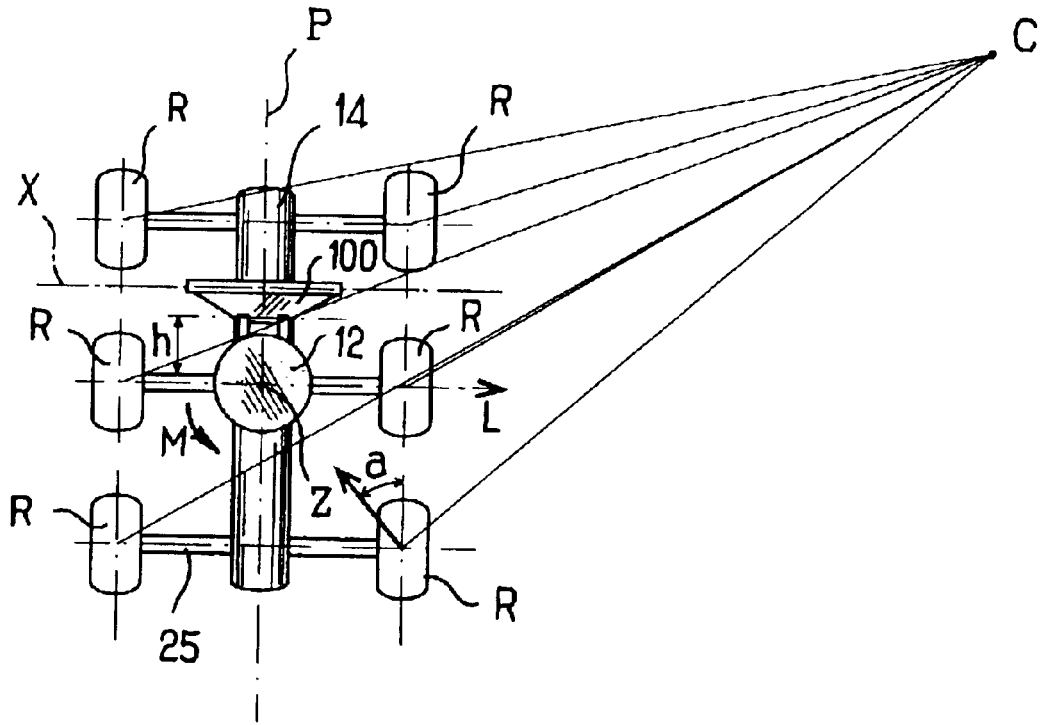
FIG_13
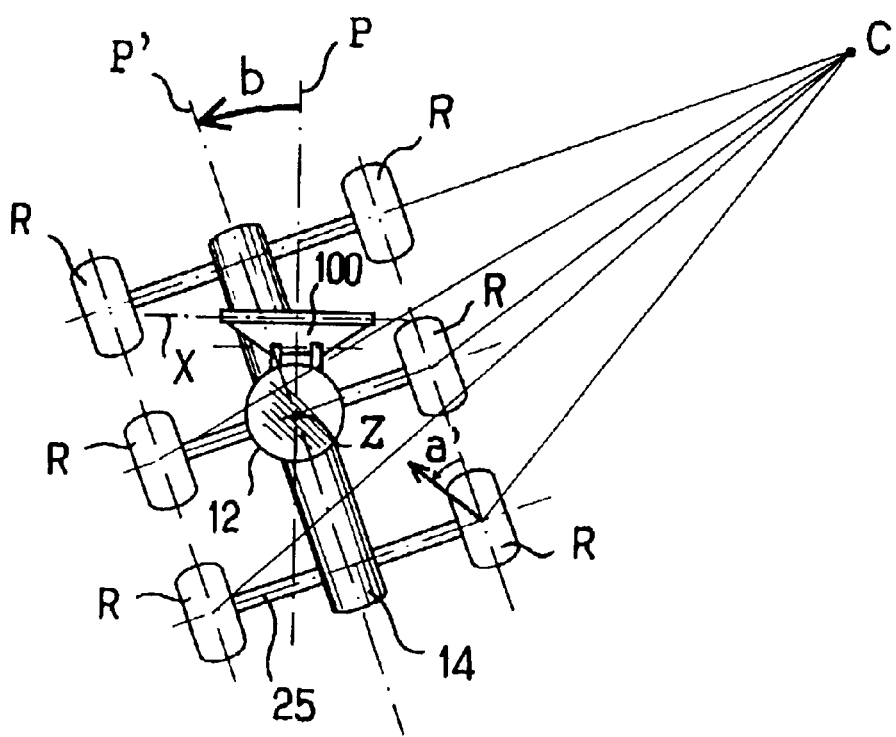
FIG_14

AIRCRAFT LANDING GEAR WITH HIGHLY OFFSET STRUT PIVOT AXIS

FIELD OF THE INVENTION

The present invention relates to an aircraft undercarriage of the type comprising a leg constituted by a strut in which there slides a telescopic rod that forms a shock absorber, the free end of the rod being hinged to a rocker beam carrying a multiple-axle wheel set.

The invention relates more particularly to landing gear in which the leg strut is hinged so as to be capable of being pivoted by an associated connection structure about a substantially horizontal axis that is highly offset from the sliding axis of the telescopic rod which is vertical in the gear-down position.

BACKGROUND OF THE INVENTION

It has been known for a long time to make landing gear structures in which the pivot axis is not coplanar with the sliding axis of the telescopic rod. Nevertheless, in existing embodiments, the offset is generally relatively small, which has always made it possible to envisage making a one-piece strut combining both the cylinder portion in which the telescopic rod slides and the lugs that receive the bearings for hinging the landing gear to the aircraft, said bearings defining the pivot axis of the leg, with this being achievable under conditions that are technologically and economically acceptable.

Such structures are illustrated, for example, in document DE-A-29 24741. That document describes a fuselage undercarriage of the type that is raised laterally, in which the strut is hinged to the fuselage about a horizontal axis extending longitudinally and that is offset from the sliding axis of the telescopic rod.

The provision of aircraft of ever-increasing weight has led to landing gear being devised comprising a large number of wheels and/or a plurality of undercarriages fitted with wheel sets. One of the retracting mechanisms envisaged for that kind of landing gear then requires structures in which the pivot axis is highly offset relative to the sliding axis of the telescopic rod, in which case it becomes technologically or economically inconceivable to make the strut as a single piece.

This leads to providing an associated connection structure that provides a mechanical connection between the strut proper and the bearings defining the pivot axis of said strut.

Proposals have already been made to make such a connection structure in integral form or in the form of an assembly of a plurality of bars. Such a configuration is unsuitable for landing gear where the rocker beam carries a large number of wheels because of the inability of the structure to transmit effectively the large twisting moment that is generated while the aircraft is taxiing, and in particular while it is turning.

A bar structure is thus illustrated in document U.S. Pat. No. 1,914,092, which describes tail landing gear presenting a hinged axis connecting it to the fuselage, which axis is highly offset relative to the pivot axis of the tail wheel. Pivoting of the tail wheel prevents it from transmitting twisting torque to the structure, so a bar configuration is entirely suitable. This would not apply if said structure were to be subjected to twisting.

In a variant, proposals have been made to implement the above-mentioned connection structure in the form of lateral panels each extending in a plane that is vertical when in the gear-down position, the two planes intersecting on the sliding axis of the telescopic rod. That structure is likewise unsuitable for landing gear in which the rocker beam carries a large number of wheels since it is incapable of transmitting high twisting moments effectively as generated when the aircraft is turning while taxiing.

One such structure is illustrated by document GB-A-1 490 088 which relates to landing gear having a complex mechanism in which the strut possesses a hinge axis that is offset relative to the sliding axis of the telescopic rod. To connect the hinge bearings to the cylinder of the strut, the strut is provided with two lateral panels extending in respective planes that are vertical in the gear-down panels with the axis of intersection between the planes coinciding with the sliding axis. To make this structure suitable for withstanding stresses coming from the ground, the lateral panels are provided with thick margins in order to prevent the panels from flexing. That disposition is heavy and ill-adapted to large undercarriages of the type presently under consideration.

OBJECT AND SUMMARY OF THE INVENTION

The invention seeks to devise a novel landing gear structure that is specially adapted to undercarriages presenting a pivot axis that is substantially horizontal and highly offset relative to the sliding axis of the telescopic rod, which axis is substantially vertical in the gear-down position.

An object of the invention is thus to provide landing gear including a connection structure suitable for transmitting effectively the twisting moments that are generated while the aircraft is taxiing, in particular while it is turning.

In accordance with the invention, this problem is solved by aircraft landing gear of the type comprising a leg constituted by a strut in which a telescopic shock-absorber rod slides along a sliding axis, the free end of the rod being hinged to a rocker beam carrying a wheel set having multiple axles, said strut being hinged to a structure of the aircraft and being capable of being pivoted by an associated connection structure about a substantially horizontal axis that is highly offset from the sliding axis of the telescopic rod which is vertical in the gear-down position. According to the invention, the connection structure is essentially constituted by two panels connecting two axially separate points of the strut to a common axis structure extending along the pivot axis of said strut, in such a manner that in the gear-down position said panels are disposed one above the other, with a top panel which is connected to the strut via a high attachment which is rigid in twisting, and with a bottom panel which is connected to the strut via a low attachment which tolerates twisting, thereby allowing the strut to warp to some extent when the aircraft is turning while taxiing.

Because of the above-specified attachments, the ability of the low attachment between the bottom panel and the strut to tolerate twisting enables the strut to be warped to some extent when the aircraft is turning while taxiing without that harming the stability of the leg, given that the structure of the high attachment is rigid in twisting.

Preferably, the top panel and the bottom panel both extend in respective planes each containing the pivot axis of the strut, the plane of the top panel being substantially orthogonal to the sliding axis of the telescopic rod.

Advantageously, the top and bottom panels are constituted by plane pieces with stiffened margins.

The high attachment between the top panel and the strut, which attachment is rigid in twisting, may be implemented in various ways, and specific mention may be made of a restrained connection or a connection which is totally rigid by being welded to or being formed integrally with said strut, or indeed a hinged connection about an axis contained in the plane of the panel and extending parallel to the pivot axis of said strut.

The low attachment between the bottom panel and the strut is capable of tolerating twisting and may likewise be made in various ways: for example it may be a connection hinged about an axis contained in the plane of the bottom panel and parallel to the pivot axis of said strut, or a swivel connection associated with a stub axle projecting from the strut, or indeed a restrained connection to at least one lug projecting from said strut.

In general, it is advantageous to provide for the high and low attachments to be level with sliding bearing surfaces for the telescopic rod inside the strut when the rod is in its pushed-in position corresponding to supporting the aircraft on the ground. Thus, while the aircraft is taxiing, loads generated normal to the axis of the strut and passing via said bearing surfaces are countered directly by the top and bottom panels, thus avoiding undesirable bending of the strut.

The common axis structure can be a separate part including the pivot bearings for pivoting the strut about its pivot axis, said separate part being fixed to the top and bottom panels via lugs that are secured to the part and/or to said panels.

In a variant, the common axis structure is integral with one of the panels.

In another variant, the common axis structure includes a panel portion that is fixed to the top panel and/or to the bottom panel, said panel portion being coplanar with and extending the associated panel.

BRIEF DESCRIPTION OF THE DRAWINGS

Other characteristics and advantages of the invention appear more clearly in the light of the following description and the accompanying drawings, relating to particular embodiments and given with reference to the figures, in which:

FIG. 1 is a perspective view of an aircraft landing gear fitted in accordance with the invention with a connection structure constituted by two panels which are superposed in the gear-down position, being connected to a common axis structure extending along the pivot axis of the strut, said panels being symbolized by shaded triangles;

FIG. 2 is an elevation view of a strut fitted with a connection structure having two superposed panels, showing a first embodiment of the associated high and low connection attachments;

FIG. 3 is an elevation view showing a variant of the preceding strut, as seen looking forwards;

FIG. 4 is a plan view of the FIG. 3 strut fitted with its connection structure, showing more clearly the top panel of said structure and how it is connected to the common axis structure;

FIG. 5 is an elevation view analogous to that of FIG. 2, with two cutaway portions showing sliding bearing surfaces for the telescopic rod which is in its pushed-in position that corresponds to supporting the aircraft on the ground;

FIG. 6 is a fragmentary view of the connection structure in which the common axis structure is integral with the top panel;

FIG. 7 is a perspective view showing another variant of the high attachment which is constituted by a totally rigid connection;

FIG. 8 shows yet another variant of the high attachment which is constituted by a hinged connection;

FIG. 9 shows, by way of example, various embodiments of the low attachment which is constituted by a hinged connection a) and b) or by a swivel connection c);

FIG. 10 is an elevation view showing yet another variant of the connection structure associated with the strut, in which the common axis structure is constituted by a separate part having lugs for connection to the top and bottom panels;

FIG. 11 is a section view on XI—XI of FIG. 10 showing more clearly how the bottom attachment is arranged;

FIG. 12 is a perspective view seen from beneath showing another variant in which the common axis structure includes a panel portion fixed to the bottom panel; and FIGS. 13 and 14 are diagrammatic plan views for explaining the behavior of the landing gear of the invention while turning, and in particular the self-steering effect obtained by the connection structure of the invention.

DETAILED DESCRIPTION OF THE PREFERRED EMBODIMENT

FIG. 1 shows an aircraft undercarriage 10 comprising a leg 11 constituted by a cylindrical strut 12 of axis Z in which there slides a telescopic rod 13 constituting a shock absorber. At the free end of the telescopic rod 13 there is hinged a rocker beam 14 carrying a multiple axle wheel set, in this case having three axles 25 each carrying a pair of wheels R. There can also be seen the two arms 15, 16 of a torsion link connecting the strut 12 to the beam 14, said arms 15, 16 being connected to associated lugs 17, 18.

The undercarriage 10 is shown in the landing gear-down position, i.e. the position in which the axis Z is substantially vertical. The strut 12 is also hinged to an aircraft structure (not shown), being capable of being pivoted by an associated connection structure about a substantially horizontal axis referenced X which is highly offset from the sliding axis Z of the telescopic rod 13. In the gear-down position, the landing gear 10 is prevented from pivoting about the axis X in the landing position by a brace 20, the bottom end of which is shown in the figures, which brace is hinged to a top lug 19 of the strut 12. It should be observed that in this arrangement, the brace 20 works in compression only.

The essential characteristic of the landing gear 10 of the invention lies in the particular arrangement of the connection structure referenced 100 that connects the pivot axis X to the cylinder of the leg strut 12. In accordance with this characteristic, the connection structure 100 is essentially constituted by two panels 101 and 102 connected to the strut 12 via two axially separate points 105 and 106. In the gear-down position as shown in FIG. 1, the panels 101 and 102 (symbolized by shaded triangles) are located one above the other. There are thus both a top panel referenced 101 which is connected to the strut 12 via a high attachment 105, and a bottom panel 102 connected to the strut 12 via a low attachment 106. The two panels 101 and 102 connect the two points 105 and 106, i.e. the associated attachments, to a common axis structure 103 which extends along the pivot axis X of the strut 12. The hinge bearings arranged at the ends of the common axis structure 103 are referenced 104.

In accordance with an essential aspect of the invention, the high attachment 105 is rigid in twisting, whereas the low attachment 106 is tolerant of twisting, thus allowing the strut 12 to warp somewhat while the aircraft is turning on the ground. This freedom of the strut 12 to warp relative to the low attachment 106 serves to optimize the strength and the deformation behavior of the landing gear under the loads that are generated by the aircraft taxiing. The twisting generated by the wheels R slipping while the aircraft is turning during taxiing is transmitted to the bottom of the strut 12 by the arms 15, 16 of the torsion link. The strut 12 is highly resistant to twisting about its axis Z and it transmits any such twisting moment to its top end, where said twisting moment is transmitted into the top panel 101 in the form of a bending moment which, ideally, loads this panel in its own plane. Because the low attachment 106 of the strut 12 tolerates twisting, the strut has a certain amount of freedom to deform relative to the low attachment, with the twisting moment warping the strut about said attachment. This ensures that the specific loads generated while the aircraft is taxiing are taken up optimally, with the structure of the landing gear being fully optimized from the points of view of strength and deformation behavior.

Moments are generated about the pivot axis X both by the fraction of the aircraft weight supported by the landing gear 10 multiplied by the offset of the strut from said pivot axis X and sometimes also by the ground-parallel resultant of the aircraft braking force multiplied by the height of the pivot axis above the ground. This total moment is countered by the brace 20 which works continuously in compression, and that turns out to be optimal for its stability and its resistance to fatigue.

It is advantageous to provide for the top panel 101 and the bottom panel 102 to extend in respective planes that contain the pivot axis X of the strut 12, the plane of the top panel 101 being substantially orthogonal to the sliding axis Z of the telescopic rod 13. FIG. 1 shows one such advantageous arrangement. In general, the top and bottom panels 101 and 102 are preferably constituted by plane parts with stiffening in their margins.

Various embodiments of the connection structure 100 are described below with reference to FIGS. 2 to 12, and in particular embodiments of the high and low attachments 105 and 106 for connection to the strut 12.

FIG. 2 shows the strut 12 without its telescopic rod, fitted with its connection structure 100 constituted by the top panel 101, the bottom panel 102, and the common axis structure 103. The high attachment of the top panel 101 to the strut 12 is constituted by a restrained connection 105.1 constituted by two pairs of superposed lugs 107. The low attachment 106 of the panel 102 to the strut 12 is constituted by a hinged connection 106.1 about an axis which is contained in the plane of said panel and which extends parallel to the pivot axis X of the strut. This hinged connection is implemented by a spool 111 secured to the bottom end of the strut 12 held in a clevis at the bottom end of the panel 102. At the top portion of the panel 102, the connection with the common axis structure 103 is a hinge connection coaxial about the axis X, while the connection between the common structure and the top panel 101 is made via a lug 109 of said common structure.

The distance between the axes X and Z is referenced D, which distance corresponds to the large offset between these axes, which-is-characteristic of landing gear for aircraft of very large dimensions. Reference d indicates the large offset between the bottom connection 106.1 and the axis Z, which distance d is selected to be as small as possible.

FIG. 3 shows a variant that is similar to that shown in FIG. 2, the difference lying in the way in which the high connection 105.1 between the top panel 101 and the strut 12 is fixed: there can be seen an assembly via two single lugs 107' of the strut 12 each held in a respective clevis associated with the panel 101. This embodiment can be seen more clearly in the plan view of FIG. 4 which shows the structure of the top panel 101 with its connection at 108 to the two side lugs 107' and its connection at 110 with the lugs 109 secured to the common axis structure 103. The assembly is arranged symmetrically about the plane P with respect to transmitting twist, which plane P is the midplane containing the sliding axis Z of the telescopic rod, and the connection fingers 108 work in shear, which is a very favorable configuration referred to as "dual shear".

FIG. 5 corresponds to FIG. 2 and has two cutaway portions in the strut 12 for showing top and bottom sliding bearing surfaces 21 and 22 for engaging the telescopic rod 13 in the strut 12. FIG. 5 shows the telescopic rod 13 in its pushed-in position, as occurs when the landing gear is supporting the aircraft on the ground: it can be seen that the high and low attachments 105 and 106 are provided at the same levels as the sliding bearing surfaces 21 and 22 in this pushed-in position. Thus, loads normal to the axis Z generated while the aircraft is taxiing and passing through these bearing surfaces 21 and 22 are countered directly by the panels 101 and 102 of the connection structure 100, thus ensuring that the strut 12 does not bend. The loads carried by the bearing surfaces for the sliding rods 13 can then be resolved as loads lying in the planes of the top and bottom panels 101 and 102, and the panels are suitable for transmitting these loads to the aircraft effectively via hinge pins. The strut 12 is thus not subjected to any bending by the stresses that result from forces generated when the aircraft turns while taxiing because of the arrangement of the high and low attachments level with the bearing surfaces for the telescopic rod 13. The large offset d of the low attachment 106 for the bottom panel 102 at the bottom end of the strut has the effect, under a lateral turning force, of generating a moment tending to twist the strut about said attachment. Since the strut has a certain amount of freedom to deform relative to said low attachment, the twisting moment warps the strut about said low attachment. This warping displacement is communicated to the rocker beam of the landing gear by the torsion link arms, thereby causing the beam to pivot in a direction which tends towards bringing closer the instantaneous turning center of the aircraft, thus improving its ability to turn: this produces a self-steering effect which is highly advantageous, and which is described in greater detail below with reference to FIGS. 13 and 14.

In the variants descried above, the common axis structure 103 is a separate part including the pivot bearings 104 enabling the strut 12 to pivot about the axis X, said separate part being fixed to the top and bottom panels 101 and 102 via lugs that are secured to the part or to said panels. FIG. 6 shows a variant in which the common axis structure 103 is integral with one of the panels of the connection structure 100, and specifically the top panel 101.

FIG. 7 shows another variant for the high attachment 105 between the top panel 101 and the strut 12. This high attachment is constituted by a totally rigid connection 105.2 which can be made by welding to the strut 12, or which can be integral with said strut by being implemented as a single piece.

In FIG. 8, the high attachment between the top panel 101 and the strut 12 is constituted by a connection 105.3 that is hinged about an axis containing in the plane of said top panel 101 and extending parallel to the pivot axis X of said strut. The top panel 101 is terminated by a clevis 122 holding a projection or spool 121 secured to the strut 12, to which said panel is hinged.

FIG. 9 shows various possible embodiments for the low attachment 106 connecting the bottom panel 102 of the connection structure 100 to the strut 12.

In a), the low attachment of the bottom panel 102 to the strut 12 is constituted by a connection 106.1 hinged about an axis contained in said panel and extending parallel to the pivot axis X of the strut. This is a hinged connection about a clevis 112 at the bottom end of the bottom panel 102, which clevis is hinged onto a spool 111 secured to the strut 12. In b), the hinged connection 106.2 is constituted by a clevis constituted by two lugs 113 associated with the strut 12 holding a single portion 114 at the bottom end of the bottom panel 102. In c) the low attachment between the bottom panel 102 and the strut 12 is constituted by a swivel connection 106.3 comprising a ball 116 received in a socket at the bottom end of the bottom panel 102 and mounted on a stub axle 115 projecting from the strut 12.

FIG. 10 shows another variant in which the common axis structure 103 is a separate part presenting lugs 109 and 117 for connection to the top and bottom panels 101 and 102. The high attachment 105.1 corresponds to the attachment described above with reference to FIGS. 2 and 3. The low attachment between the bottom panel 102 and the strut 12 is constituted by a restrained connection 106.4 with at least one projecting lug 118, in this case two such lugs, that are secured to the strut 12, the fixing pins being referenced 119. The vicinity of the low attachment 106.4 is also shown in section in FIG. 11 which enables its structure to be understood more clearly. The lugs 118 are lightweight so as to ensure that the bottom attachment tolerates twisting.

FIG. 12 shows that the common axis structure 103 includes a panel torsion 120 fixed to the bottom panel 102, said panel portion being coplanar with and extending the bottom panel 102. The low attachment 106.1 is hinged to lugs 111' projecting from the strut 12.

FIGS. 13 and 14 are plan views for showing how the aircraft landing gear of the invention behaves when the aircraft turns while taxiing, the instantaneous turning center being the point referenced C.

While turning, the resultant of the forces generated via the respective wheels R due to their slip due to the fact that their mean plane is not parallel to the tangent to the track they are following while the aircraft is turning about the instantaneous center of rotation C (said plane making an angle referenced a with the tangent to the track, as shown for the rear right-hand wheel of the landing gear), can be represented overall by a lateral force referenced L applied to the axis Z of the strut and the associated sliding rod, and the low attachment of the bottom panel of the connection structure 100 has the effect that the lateral force creates a warping moment of value M=h.L. This moment causes the strut to deform in twisting through an angle b as shown in FIG. 14. The strut 12 then causes the rocker beam 14 to turn together therewith by means of the torsion link so that the beam turns in such a manner as to reduce the slip angles a, thereby reducing tire wear, and also reducing the forces to which the structure of the landing gear is subjected. This makes the instantaneous turning center C come nearer, thereby reducing the turning circle and consequently improving the turning ability of the aircraft. The angle a becomes an angle a' where a'=a−b. FIG. 13 shows the situation that would apply if the landing gear were perfectly rigid in twisting, with the angle a then remaining constant throughout the turning track. In contrast, FIG. 14 shows the behavior that results from the tolerance to twisting of the low attachment, with warping of the strut giving rise to turning through an angle b, thus providing landing gear that is capable of deforming under turning forces, and that is suitable for taking advantage of the above-mentioned self-steering effect.

The invention is not limited to the embodiments described above, but on the contrary covers any variant using equivalent means to reproduce the essential characteristics specified above.

What is claimed is:

1. An aircraft landing gear comprising a leg (11) constituted by a strut (12) in which a telescopic shock-absorber rod (13) slides along a sliding axis (Z), the free end of the rod being hinged to a rocker beam (14) carrying a wheel set having multiple axles, said strut being hinged to a structure of the aircraft and being capable of being pivoted by an associated connection structure about a substantially horizontal axis (X) that is highly offset from the sliding axis (Z) of the telescopic rod (13) which is vertical in the gear-down position, wherein the connection structure (100) is essentially constituted by two panels (101, 102) connecting two axially separated points of the strut (12) to a common axis structure (103) extending along the pivot axis (X) of said strut, in such a manner that in the gear-down position said panels are disposed one above the other, with a top panel (101) which is connected to the strut (12) via a high attachment (105) which is rigid in twisting, and with a bottom panel (102) which is connected to the strut (12) via a low attachment (106) which tolerates twisting, thereby allowing the strut (12) to warp to some extent when the aircraft is turning while taxiing.

2. The landing gear according to claim 1, wherein the top panel (101) and the bottom panel (102) both extend in respective planes each containing the pivot axis (X) of the strut (12), the plane of the top panel (101) being substantially orthogonal to the sliding axis (Z) of the telescopic rod (13).

3. The landing gear according to claim 1, wherein the top and bottom panels (101, 102) are constituted by plane pieces with stiffened margins.

4. The landing gear according to claim 1, wherein the high attachment (105) between the top panel (101) and the strut (12) is constituted by a fixed connection (105.1).

5. The landing gear according to claim 1, wherein the high attachment (105) between the top panel (101) and the strut (12) is constituted by a totally rigid connection (105.2) achieved by welding to or by being formed integrally with said strut.

6. The landing gear according to claim 1, wherein the high attachment (105) between the top panel (101) and the strut (12) is constituted by a connection (105.3) that is hinged about an axis contained in the plane of said panel and extending parallel to the pivot axis (x) of said strut.

7. The landing gear according to claim 1, wherein the low attachment (106) between the bottom panel (102) and the strut (12) is constituted by a connection (106.1, 106.2) that is hinged about an axis contained in the plane of said panel and extending parallel to the pivot axis (X) of said strut.

8. The landing gear according to claim 1, wherein the low attachment (106) between the bottom panel (102) and the strut (12) is constituted by a swivel connection (106.3) associated with a stub axle (115) projecting from said strut.

9. The landing gear according to claim 1, wherein the low attachment (106) between the bottom panel (102) and the strut (12) is constituted by a restrained connection (106.4) to at least one lug (118) projecting from said strut.

10. The landing gear according to claim 1, wherein the high and low attachments (105, 106) are provided level with sliding bearing surfaces (21, 22) for the telescopic rod (13) in the strut (12) when the rod is in its pushed-in position corresponding to supporting the aircraft on the ground.

11. The landing gear according to claim 1, wherein the common axis structure (103) is a separate part including the pivot bearings (104) enabling the strut (12) to pivot about its pivot axis (X), said separate part being fixed to the top and bottom panels (101, 102) via lugs that are secured thereto and/or to said panels.

12. The landing gear according to claim 1, wherein the common axis structure (103) is integral with one of the panels (101).

13. The landing gear according to claim 1, wherein the common axis structure (103) includes a panel portion (120) that is fixed to the top panel (101) and/or to the bottom panel (102), said panel portion being coplanar with and extending the associated panel.

\* \* \* \* \*